US012592328B2

(12) United States Patent
Li

(10) Patent No.: US 12,592,328 B2
(45) Date of Patent: Mar. 31, 2026

(54) RESISTOR TRIMMING DEVICE AND ELECTRONIC DEVICE

(71) Applicant: NUVOTON TECHNOLOGY CORPORATION, Hsinchu City (TW)

(72) Inventor: Wen-Yi Li, Hsinchu City (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 375 days.

(21) Appl. No.: 18/230,855

(22) Filed: Aug. 7, 2023

(65) Prior Publication Data

US 2024/0055162 A1 Feb. 15, 2024

(30) Foreign Application Priority Data

Aug. 12, 2022 (TW) ................................. 111130376

(51) Int. Cl.
*H01C 10/20* (2006.01)
*H01C 10/14* (2006.01)

(52) U.S. Cl.
CPC ............. *H01C 10/20* (2013.01); *H01C 10/14* (2013.01)

(58) Field of Classification Search
CPC ................................ H01C 10/20; H01C 10/14
See application file for complete search history.

(56) References Cited

U.S. PATENT DOCUMENTS 7,663,470 B2 * 2/2010 Kimura .................. H01C 10/14 338/195
2009/0039955 A1 * 2/2009 Hosoya .................... H03H 7/24 338/215
2020/0161031 A1 * 5/2020 Kaushik ............... H01C 17/267

FOREIGN PATENT DOCUMENTS

CN 116248120 * 6/2023 .............. H03M 1/66
CN 118012188 * 5/2024 ............. G05F 1/561
EP 0780851 * 6/1997 ............. H01C 17/22

OTHER PUBLICATIONS

CN-116248120 machine translation (Year: 2023).*
CN-118012188 machine translation (Year: 2024).*

* cited by examiner

*Primary Examiner* — Kyung S Lee
(74) *Attorney, Agent, or Firm* — MUNCY, GEISSLER, OLDS & LOWE, P.C.

(57) ABSTRACT

A resistor trimming device comprising a resistor trimming unit is provided, which divides a single one adjustable resistor string into a plurality of adjustable resistor string groups, so that a resistance of the parallel resistor faced by a switch can be effectively reduced, and a design of the on-resistance and off-resistance of the switch can comply with a general design rule. In addition, the resistor trimming device provided further comprises a decoder. When trimming the overall resistance of an electronic device, a user can directly input a binary code or an original thermometer code used in the adjustable resistor string being not grouped, without knowing an encoding manner, and then, the decoder generates a trimming thermometer code and a group code to control a main switch and switches in the multiple adjustable resistor string groups being the grouped from the adjustable resistor string.

18 Claims, 2 Drawing Sheets

RESISTOR TRIMMING DEVICE AND ELECTRONIC DEVICE

CROSS-REFERENCE TO RELATED APPLICATION

This application claims the priority benefit of Taiwan application serial no. 111130376, filed on Aug. 12, 2022. The full disclosure of which is incorporated herein by reference.

BACKGROUND

Technical Field

The present disclosure relates to a resistor trimming device and an electronic device using thereof. More particularly, the present disclosure relates to a resistor trimming device and an electronic device which divides a single adjustable resistor string element into a plurality of adjustable resistor string groups, so that a resistance of the parallel resistor faced by a switch can be effectively reduced.

Description of Related Art

When designing a circuit, a resistor trimming device is usually used to micro-adjust the current source and/or the power source, so as to achieve more precise circuit characteristics. Generally, the resistor trimming technology is usually based on the binary code and the thermometer code. The resistor trimming device using the binary code comprises a single adjustable resistor element. The single adjustable resistor element comprises a plurality of resistors in series and a plurality of switches. Two ends of each switch are respectively electrically connected with two ends of corresponding resistors. That is, every open end is connected in parallel with the corresponding resistor). The resistances of the resistors are different from each other. For example, the resistance is $2^{i-1}$R, wherein i is an integer in 1 to N, N is the number of bits for the binary code, just same as the number of the resistors and switches, and R is the minimum one of the resistors. By turning on/off the switches, the required trimming resistance may be obtained. However, there is a resistor matching issue in the resistor trimming device based on the binary code. Because the design of the resistance is $2^{i-1}$R, if the resistor is not matching, the practical trimming resistance will be different from the predetermined trimming resistance, so as to affect the precision of the overall circuit. Particularly, once the bigger the number of bits N is, the harder the resistance matching achieves. In other words, the precision of the overall circuit is lower.

The resistor trimming device using the thermometer code comprises a single adjustable resistor element. The single adjustable resistor element comprises a plurality of resistors in series and a plurality of switches. The resistance of each resistor is R. One end of each switch is electrically connected to one end of corresponding resistor, and the other end of each switch is electrically connected to the other end of the last resistor in the resistors in series. By controlling turning on/off the switches, the trimming resistance is between 0 to N*R. When the number of bits in the thermometer code increases, it causes the difficulty in choosing the switch to turning on/off the resistors, and it further affects the precision of the circuit. For instance, if the number of bits for the thermometer code is 100, the total number of resistors connected in series is 100. In general design rules, the resistance of the turn on resistance is preferably 1/1000 times the resistance of the resistor connected to the switch in parallel, and the resistance of the turn off resistance is preferably 1000 times the resistance of the resistor connected to the switch in parallel. Thus, the resistance of the parallel resistor which one switch faces is 100R, the resistance of the turn on resistor which the switch faces is (1/10)*R, and the resistance of the turn off resistor which the switch faces is $10^5$*R. However, in practice, when the resistance of the parallel resistor is bigger, it is harder to make the design of the turn on resistor and the turn off resistor meet the design rules described above.

SUMMARY

A resistor trimming device is provided in the embodiments of the present disclosure, and the resistor trimming device comprises a decoder and a resistor trimming module. The decoder is configured to receive a binary code or an original thermometer code, and a trimming thermometer code and a group code are generated by the decoder based on the binary code or the original thermometer code. The resistor trimming module is electrically connected to the decoder, and the resistor trimming module comprises M adjustable resistor string groups, wherein M is a number of groups, and M is an integer which is greater than 2. Each of the M adjustable resistor string groups comprises a main switch, (N−1) switches, and N resistors with the same resistance as each other, wherein a first end of the main switch is electrically connected to a first end of the first resistor of the N resistors, and a second end of the main switch is electrically connected to a second end of a N-th resistor of the N resistors. A first end of the i-th switch of the (N−1) switches is electrically connected to a second end of the i-th resistance of the N resistors, and second end of the i-th switch of the (N−1) switches is electrically connected to a N-th resistor of the N resistors, wherein N is a number of resistors of each the M adjustable resistor string groups, N is an integer which is greater than 2, and i is an integer between 1 and N. The main switch and the (N−1) switches of each of the M adjustable resistor string groups are controlled based on the trimming thermometer code and the group code.

An electronic device is further provided in the present disclosure, including a first resistor, a second resistor and a resistor trimming device described above, wherein the resistor trimming module is electrically connected between the first resistor and the second resistor.

In summary, a resistance of the parallel resistor which a switch faces may be effectively reduced by the resistor trimming device provided in the embodiment of the present disclosure, so that a design of the turn on resistor and turn off resistor for the switch can meet a general design rule. Moreover, when a user trims the overall resistance of an electronic device, the user needs not to realize the coding method and may directly input a binary code or an original thermometer code used before the adjustable resistor strings are grouped so that the resistor trimming is proceeded.

In order to further understand the technology, means, and effects of the present disclosure, reference may be made by the detailed description and drawing as follows. Accordingly, the purposes, features and concepts of the present disclosure can be thoroughly and concretely understood. However, the following detailed description and drawings are only used to reference and illustrate the implementation of the present disclosure, and they are not used to limit the present disclosure.

BRIEF DESCRIPTION OF THE DRAWINGS

The accompanying drawings are provided to enable person having ordinary skill in the art can further understand the present disclosure, and the accompanying drawings are incorporated in and constitute a part of the specification of the present disclosure. The drawings illustrate exemplary embodiments of the present disclosure, and the description in the specification of the present disclosure is served to explain together the principal of the present disclosure.

DETAILED DESCRIPTION

Figure 1:
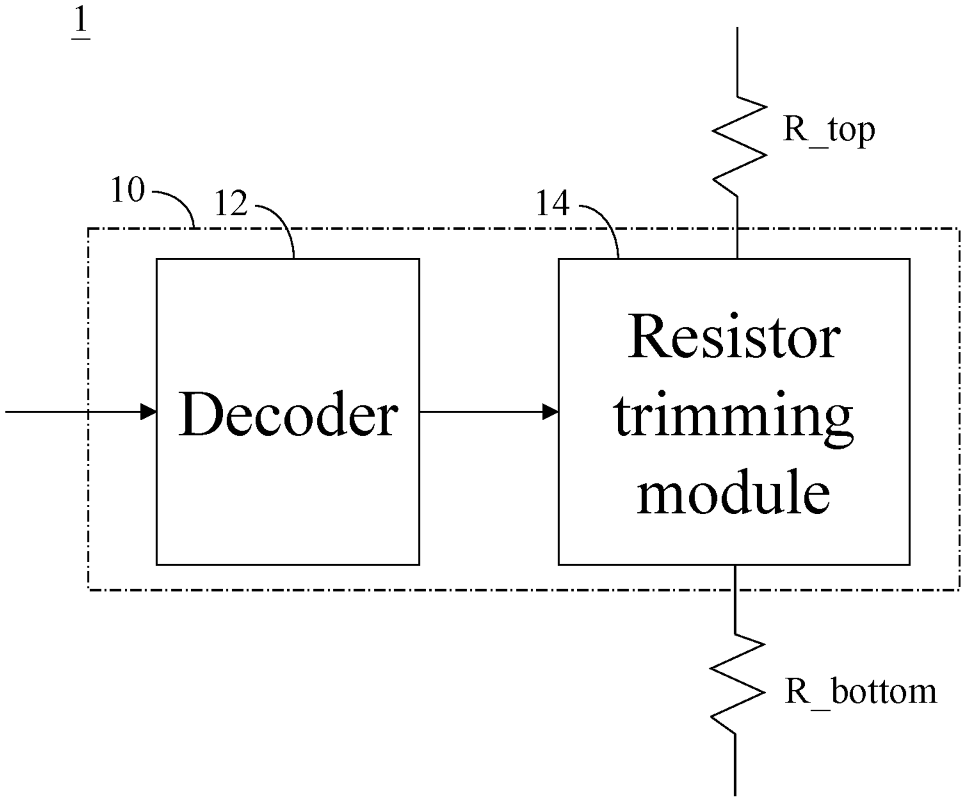
FIG. 1 is a block diagram of a resistor trimming device according to an embodiment of the present disclosure.

Reference will now be made in detail to exemplary embodiments of the present disclosure, exemplary embodiments of which are illustrated in the accompanying drawings. Wherever possible, the same element number is used in the drawings and the description to refer to the same or the similar part. Furthermore, exemplary embodiments are only one of implemental ways in the concept of design of the present disclosure, none of exemplars described below is intended to limit the present disclosure.

The principle in the present disclosure is that dividing a single adjustable resistor string which comprises a plurality of serial resistors into a plurality of adjustable resistor string groups. Due to the division, for each adjustable resistor string group, a resistance of the parallel resistor which a switch faces can be effectively reduced, so that a design of the turn on resistor and turn off resistor of the switch may meet a general design rule easily. Furthermore, because the single adjustable resistor string is divided into the plurality of adjustable resistor string groups, it is necessary to further convert the original thermometer code to generate a group code and a trimming thermometer code. Based on the group code, the adjustable resistor string group is selected, and only the selected adjustable resistor string group is configured to control a main switch and switches thereof based on the trimming thermometer code. Other unselected adjustable resistor string groups connected in series before or after the selected adjustable resistor string group are configured to determine whether the main switch and switches thereof are turned on or off based on the sequence of the adjustable resistor string groups.

Further, the selected adjustable resistor string group is configured to use the trimming thermometer code to control the main switch and the switches thereof, so that one resistance of 0, R, 2R, . . . , (N−1)R is selected as part of the trimming resistances, wherein N is the number of resistors in the adjustable resistor string groups. The main switch and the switches of the adjustable resistor string group which is connected in series before the selected adjustable resistor string group are turned off directly, and the main switch and the switches of the adjustable resistor string group which is connected in series after the selected adjustable resistor string group are turned on directly. Thus, only the selected adjustable resistor string group is configured to control the main switch and the switches thereof based on the trimming thermometer code. The resistor trimming device is configured to provide one resistance of 0, R, 2R, . . . , (N−1)R as part of the trimming resistance, wherein M is number of groups.

Keeping generality, the original thermometer code is generated as a binary code in the prior art. For example, 0 to 4R of the original thermometer code are respectively indicated as 0000, 0001, 0011, 0111 and 1111 corresponding to the binary code. Thus, the technical method according to the present disclosure is recording a code table which comprises a conversion relationship between the binary codes or the original thermometer codes, the group code and the trimming thermometer code. Via the code table, the binary code in converted to generate the group code and trimming thermometer code. Then, the generated group codes and the trimming thermometer codes are configured to control the main switch and the switches of the adjustable resistor string groups respectively.

At first, refer to FIG. 1, and FIG. 1 is a block diagram of a resistor trimming device according to an embodiment of the present disclosure. The overall resistance of an electronic device 1 is configured to finely adjust the utilized current source and/or the power source, which is not shown in FIG. 1, via a resistor trimming device 10, so as to achieve more precise circuit characteristics. The electronic device 1 is, for example, a packed integrated circuit chip or other types of a completed module, and the electronic device 1 has specific resistors R_top and R_buttom. The resistor trimming device 10 is electrically connected between the specific resistors R_top and R_buttom, wherein the specific resistors R_top and R_buttom are internal resistors in the electronic device 1. When the trimming resistance generated by the resistor trimming device 10 changes, the overall resistance of the electronic device 1 changes accordingly.

The resistor trimming device 10 comprises a decoder 12 and a resistor trimming module 14, the resistor trimming module 14 is electrically connected to the decoder 12, and the resistor trimming module 14 is electrically connected between the specific resistors R_top and R_buttom. The decoder 12 is configured to receive the binary code, and decode the binary code so as to generate the group codes and the trimming thermometer codes of the adjustable resistor string groups corresponding to the resistor trimming module 14. Unlike the prior art, the resistor trimming module 14 comprises a plurality of adjustable resistor string groups, so that a resistance of the parallel resistor which a switch faces in each adjustable resistor string group may be reduced. Taking an adjustable resistor string which may generate a maximum resistance 100R in the prior art as an example, after dividing the adjustable resistor string into 10 groups, the original resistance from 100R to 11R for the parallel resistors which the switch faces will become only 10R at most.

It is not necessary for a user to understand how to generate the correct group code and the trimming thermometer code, the user may use the precious way to input the binary code. In another embodiment of the present disclosure, the decoder 12 may also be configured to decode the preciously original thermometer code, so as to generate the group code and the trimming thermometer code. General speaking, the user only needs to input the binary code or the original thermometer code utilized before the adjustable resistor string is grouped, and then the resistor trimming device 10 may generate corresponding trimming resistance. The overall resistance of the electronic device is the generated trimming resistance plus the resistances of the specific resistors R_top and R_bottom.

Figure 2:
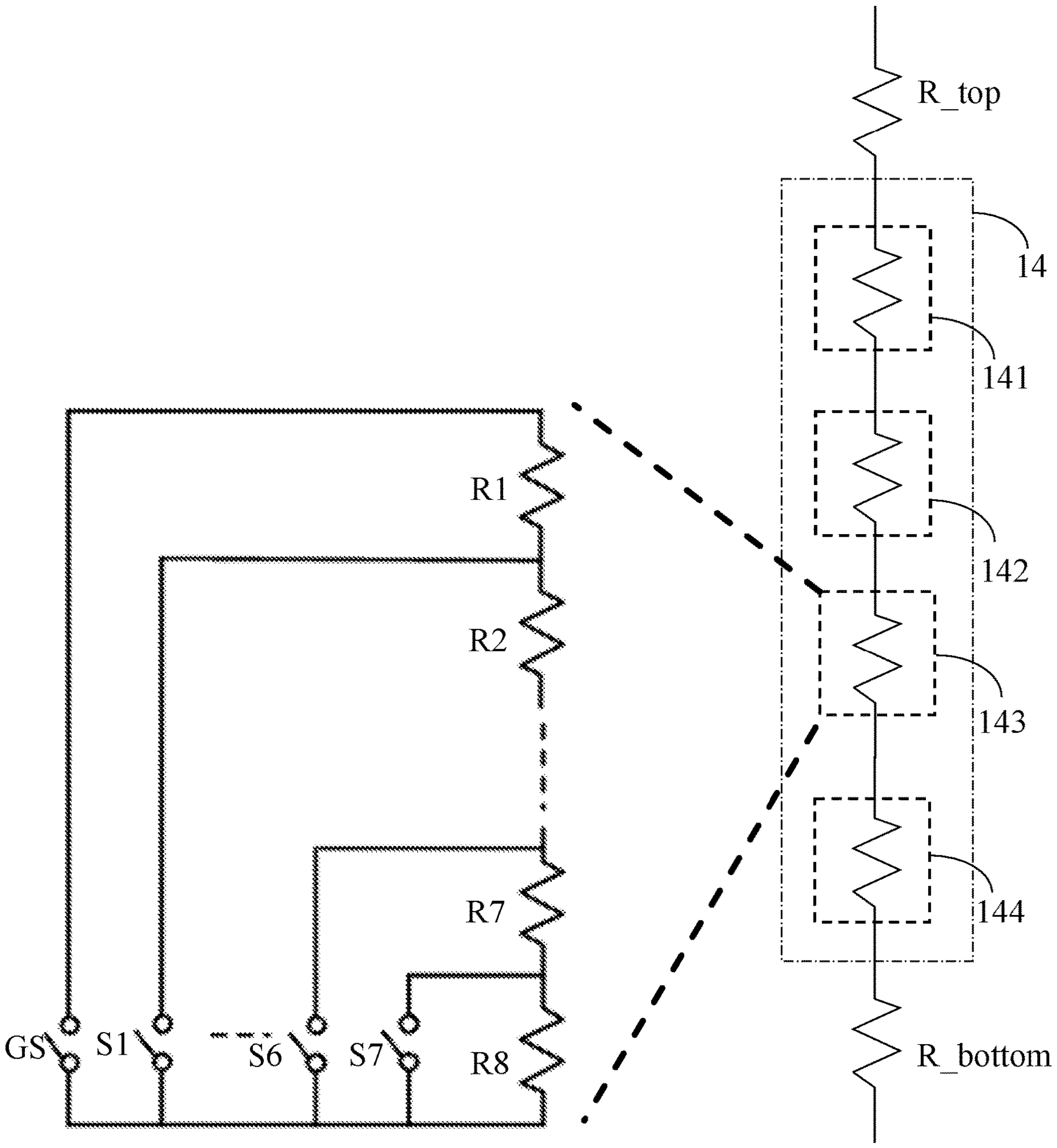
FIG. 2 is a circuit diagram of an adjustable resistor string in a resistor trimming module according to an embodiment of the present disclosure.

Refer to FIG. 1 and FIG. 2, and FIG. 2 is a circuit diagram of an adjustable resistor string in a resistor trimming module according to an embodiment of the present disclosure. In FIG. 2, the resistor trimming module 14 comprises 4 adjustable resistor string groups 141~144, and the resistances generated by each adjustable resistor string group are one of 0, R, 2R~8R. Although the four adjustable resistor string groups 141~144. For example, dividing into 4 groups as an example. The resistances generated by each adjustable resistor string group are one of 0, R, 2R~8R are described as an example in this embodiment, but the present disclosure is not limited thereto.

Taking the adjustable resistor string group 143 as an example, the adjustable resistor string group 143 comprises resistors R1~R8 and switches GS and S1~S7. The first end and the second end of the switch GS are respectively electrically connected to the first end of the resistor R1 and the second end of the resistor R8, The first end of the switch Si is electrically connected to the second end of the resistor Ri and the second end of the switch Si is electrically connected to the second end of the resistor R8. The resistors R1~R8 are connected in series. In other words, the first end of the resistor R2 is electrically connected to the second end of the resistor R1, and so on, the first end of the resistor R8 is electrically connected to the second end of the resistor R7, wherein i is an integer between 1~8. When the adjustable resistor string group 143 is selected, the main switch GS and the switches S1~S7 of the adjustable resistor string groups 141 and 142 are turned off, so that the adjustable resistor string groups 141 and 142 are respectively configured to provide the resistance of 8R as part of the trimming resistance. In addition, the main switch GS in the adjustable resistor string group 144 is turned on directly, so that the adjustable resistor string group 144 is not as part of the trimming resistance. The main switch GS and switches S1~S7 in the adjustable resistor string group 143 is controlled to be turned on or off based on the trimming thermometer code. In the embodiment, an original single adjustable resistor string which may generate 0, R, 2R~31R, is divided into 4 adjustable resistor string groups 141~144, so as to reduce the resistance of the parallel resistor which the switch S1 faces, and then a design of the turn on resistance and turn off resistance of the switch can meet a general design rule.

Taking the embodiment shown in FIG. 2 as an example, the inputting binary code comprises 5 bits, which may indicate the resistance selection between 0, R, 2R, . . . , 31R. However, due to the division, the decoder 12 is designed to have a code table, the code table is configured to record a mapping relationship between the binary code and a group thermometer code which comprises the group code and the trimming thermometer code described above. In this embodiment, the code table is shown as below, wherein the group thermometer code comprises the group code and the trimming thermometer code. Additionally, in other embodiments, the code table may also be configured to record a mapping relationship between the original thermometer code corresponding to the binary code and the group thermometer code wherein the original thermometer code is without using the division concept in the present disclosure.

| Binary code D[5:0]/ decimal number | Group code G[2:0] | Trimming thermometer code Y[6:0] |
|---|---|---|
| 00000/0 | 000 | 0000000 |
| 00001/1 | 000 | 0000001 |

-continued

| Binary code D[5:0]/ decimal number | Group code G[2:0] | Trimming thermometer code Y[6:0] |
|---|---|---|
| 00010/2 | 000 | 0000011 |
| 00011/3 | 000 | 0000111 |
| 00100/4 | 000 | 0001111 |
| 00101/5 | 000 | 0011111 |
| 00110/6 | 000 | 0111111 |
| 00111/7 | 000 | 1111111 |
| 01000/8 | 001 | 0000000 |
| 01001/9 | 001 | 0000001 |
| 01010/10 | 001 | 0000011 |
| 01011/11 | 001 | 0000111 |
| 01100/12 | 001 | 0001111 |
| 01101/13 | 001 | 0011111 |
| 01110/14 | 001 | 0111111 |
| 01111/15 | 001 | 1111111 |
| 10000/16 | 011 | 0000000 |
| 10001/17 | 011 | 0000001 |
| 10010/18 | 011 | 0000011 |
| 10011/19 | 011 | 0000111 |
| 10100/20 | 011 | 0001111 |
| 10101/21 | 011 | 0011111 |
| 10110/22 | 011 | 0111111 |
| 10111/23 | 011 | 1111111 |
| 11000/24 | 111 | 0000000 |
| 11001/25 | 111 | 0000001 |
| 11010/26 | 111 | 0000011 |
| 11011/27 | 111 | 0000111 |
| 11100/28 | 111 | 0001111 |
| 11101/29 | 111 | 0011111 |
| 11110/30 | 111 | 0111111 |
| 11111/31 | 111 | 1111111 |

The group code G[2:0] is indicated as the selected adjustable resistor string group. In this embodiment, when the decimal number of binary code D[5:0] is indicated as 0 to 7, the group code G[2:0]=000 is indicated that the adjustable resistor string group 141 is selected. When the decimal number of binary code D[5:0] is indicated as 8 to 15, the group code G[2:0]=001 is indicated that the adjustable resistor string group 142 is selected. When the decimal number of binary code D[5:0] is indicated as 16 to 23 the group code G[2:0]=011 is indicated that the adjustable resistor string group 143 is selected. When the decimal number of binary code D[5:0] is indicated as 24 to 31, the group code G[2:0]=111 is indicated that the adjustable resistor string group 144 is selected.

When the adjustable resistor string group 141 is selected, the main switches GS in the adjustable resistor string groups 142~144 are turned on. The main switch GS and switches S1~S7 in the adjustable resistor string group 141 are controlled to be turned on or off based on the trimming thermometer code Y[6:0]. When Y[6:0]=0000000, the main switch GS and switches S1~S7 in the adjustable resistor string group 141 are turned on, so that the trimming resistance is 0. When Y[6:0]=0000001, the main switches GS and S1 in the adjustable resistor string group 141 are turned off, and the switches S2~S7 are turned on, so that the trimming resistance is R, and so on. When Y[6:0]=1111111, the main switch GS and the switches S1~S7 in the adjustable resistor string group 141 are turned off, so that the trimming resistance is 7R. Thus, when the decimal number of binary code D[5:0] is indicated as 0 to 7, the trimming resistance is 0, R, and 2R~7R.

When the adjustable resistor string group 142 is selected, the main switches in the adjustable resistor string groups 142 and 143 are turned on, and the main switch GS and switches S1~S7 in the adjustable resistor string group 141 are turned off. The main switch GS and switches S1~S7 in the adjustable resistor string group 142 are controlled to be turned on or off based on the trimming thermometer code Y[6:0]. When Y[6:0]=0000000, the main switch GS and switches S1~S7 in the adjustable resistor string group 142 are turned on, so that the trimming resistance is 8R. When Y[6:0]=0000001, the main switch GS and switch S1 in the adjustable resistor string group 142 are turned off, and the switches S2~S7 are turned on, so that the trimming resistance is 9R, and so on. When Y[6:0]=1111111, the main switch GS and the switches S1~S7 in the adjustable resistor string group 142 are turned off, so that the trimming resistance is 15R. Thus, when the decimal number of binary code D[5:0] is indicated as 8 to 15, the trimming resistance is 8R~15R.

When the adjustable resistor string group 143 is selected, the main switch in the adjustable resistor string group 144 is turned on, and the main switches and switches S1~S7 in the adjustable resistor string group 141 and 142 are turned off. The main switch GS and switches S1~S7 in the adjustable resistor string group 143 are controlled to be turned on or off based on the trimming thermometer code Y[6:0]. When Y[6:0]=0000000, the main switch GS and switches S1~S7 in the adjustable resistor string group 143 are turned on, so that the trimming resistance is 16R. When Y[6:0]=0000001, the main switch GS and switch S1 in the adjustable resistor string group 143 are turned off, and the switches S2~S7 are turned on, so that the trimming resistance is 7R, and so on. When Y[6:0]=1111111, the main switch GS and the switches S1~S7 in the adjustable resistor string group 143 are turned off, so that the trimming resistance is 23R. Thus, when the decimal number of binary code D[5:0] is indicated as 16 to 23, the trimming resistance is 16R~23R.

When the adjustable resistor string group 144 is selected, the main switches and switches S1~S7 in the adjustable resistor string group 141~143 are turned off. The main switch GS and every switch S1~S7 in the adjustable resistor string group 144 are controlled to be turned on or off based on the trimming thermometer code Y[6:0]. When Y[6:0]=0000000, the main switch GS and switches S1~S7 in the adjustable resistor string group 144 are turned on, so that the trimming resistance is 24R. When Y[6:0]=0000001, the main switch GS and switch S1 in the adjustable resistor string group 144 are turned off, and the switches S2~S7 are turned on, so that the trimming resistance is 25R, and so on. When Y[6:0]=1111111, the main switch GS and the switches S1~S7 in the adjustable resistor string group 144 are turned off, so that the trimming resistance is 31R. Thus, when the decimal number of binary code D[5:0] is indicated as 24 to 31, the trimming resistance is 24R-31R.

When it is expressed by the general formula, the group code G[(M−2):0] is indicated which adjustable resistor string groups are selected. The group code G[(M−2): 0]=00 . . . 0 is indicated that only the first adjustable resistor string group is selected. When a first bit of the group code G[(M−2):0] to a k-th bit of the group code G[(k−1):0] is 11 . . . 1, and a (k+1)-th bit of the group code G[(M−2):0] to a (M−1)-th bit of the group code G[(M−2):k] is 00 . . . 0, the group code G[(M−2):0] is configured to indicate that the (k+1)-th adjustable resistor string group is selected, wherein k is an integer between 1 to (M−1), and M is the number of groups. When the (k+1)-th the adjustable resistor string group is selected, the main switch and every switch in every of the first adjustable resistor string group to the k-th adjustable resistor string group are turned off, the main switch and every switch in the (k+2)-th to the M-th adjustable resistor string group in the M adjustable resistor string groups are turned on, and the main switch and every switch in the (k+1)-th adjustable resistor string group is controlled by the trimming thermometer code to be turned on or off. When every bit in the trimming thermometer code is 0, the main switch and every switch in the (k+1)-th adjustable resistor string group are turned on. When the following x bits in the trimming thermometer code Y[(N−2):0] are 1 (x is 1 to N−1, that means Y[(N−2): (x)]=000 . . . 0 and Y[(x−1): 0]=111 . . . 1), so that the main switch of the (k+1)-th adjustable resistor string group is turned off, the switches S1~Sx are turned off, and the switches Sx+1~SN−1 are turned on.

In shorts, based on the binary code or based on the utilized original thermometer code without dividing, the decoder 12 is configured to generate the group thermometer code which comprises the group code G[(M−2):0] and the trimming thermometer code Y[(N−2):0]. Further, the decoder 12 is configured to generate a control signal base on a logic circuit, in order to control the main switch and switches of each adjustable resistor string group.

In summary, the resistor trimming unit in the resistor trimming device provided in the embodiments of the present disclosure may divide a single adjustable resistor string into a plurality of adjustable resistor string groups, so that a resistance of the parallel resistor which a switch faces can be effectively reduced, and a design of the turn on resistance and turn off resistance of the switch can comply with a general design rule. In addition, the resistor trimming device provided further comprises a decoder. When the overall resistance of an electronic device is trimmed, a user can directly input a binary code or an original thermometer code utilized before the adjustable resistor string is grouped, without knowing an encoding manner, and then, the decoder generates a trimming thermometer code and a group code to control a main switch and switches in the multiple adjustable resistor string groups being the grouped from the adjustable resistor string All examples and embodiments in the present disclosure are only used to state the purpose. The modifications or changes based on the present disclosure will be suggested to those skilled in the art, and are be comprised in the essence, the scope, and the scope of the appended claims in the present disclosure.

What is claimed is:

1. A resistor trimming device, comprising:

a decoder, configured to receive a binary code or an original thermometer code, and generate a trimming thermometer code and a group code based on the binary code or the original thermometer code; and a resistor trimming module, electrically connected to the decoder, and comprising M adjustable resistor string groups serially connected to each other, wherein M is a number of groups, and M is an integer which is greater than 2, wherein each of the resistor string groups comprises a main switch, (N−1) switches, and N resistors with the same resistance as each other, wherein a first end of the main switch is electrically connected to a first end of the first resistor of the N resistors, and a second end of the main switch is electrically connected to a second end of a N-th resistor of the N resistors, wherein a first end of the i-th switch of the (N−1) switches is electrically connected to a second end of the i-th resistance of the N resistors, and second end of the i-th switch of the (N−1) switches is electrically connected to the N-th resistor of the N resistors, wherein N is a number of resistors of each the M adjustable resistor string groups, N is an integer which is greater than 2, and i is an integer between 1 and N, and wherein the main switch and the (N−1) switches of each of the M adjustable resistor string groups are controlled based on the trimming thermometer code and the group code.

2. The resistor trimming device of claim 1, wherein the decoder comprises:

a code table and a logic circuit, wherein the code table records an mapping relationship between a group thermometer code and the binary code or the original thermometer code, the group thermometer code comprises the group code and the trimming thermometer code, and the logic circuit is configured to generate a plurality of control signals based on the group code and the trimming thermometer code, so as to control the main switch and the (N−1) switches of each of the M adjustable resistor string groups.

3. The resistor trimming device of claim 2, wherein the group code has (M−1) bits which are indicated by G[(M−2):0], the trimming thermometer code has N bits which are indicated by Y[(N−2):0], the group code G[(M−2):0] is configured to indicate one of the M adjustable resistor string groups which is selected, and the trimming thermometer code Y[(N−2):0] is configured to control the main switch and the (N−1) switches of the selected M adjustable resistor string group.

4. The resistor trimming device of claim 3, wherein the group code G[(M−2):0] being 00 . . . 0 indicates that a first adjustable resistor string group in the M adjustable resistor string groups is selected;

wherein when a first bit to a k-th bit of the group code G[(M−2):0] are 11 . . . 1 and a (k+1)-th bit to a (M−1)-th bit of the group code G[(M−2):0] are 00 . . . 0, the group code G[(M−2):0] indicates that the (k+1)-th adjustable resistor string group of the M adjustable resistor string groups is selected, and k is an integer between 1 and (M−1).

5. The resistor trimming device of claim 4, wherein when the first adjustable resistor string group is selected, the main switches of the second to the M-th adjustable resistor string groups of the M adjustable resistor string groups are turned on, and the main switch and the (N−1) switches of the first adjustable resistor string group are controlled based on the thermometer code.

6. The resistor trimming device of claim 4, wherein when a (k+1)-th adjustable resistor string group is selected, the main switch and the (N−1) switches of each of the first to the k-th adjustable resistor string groups of the M adjustable resistor string groups are turned off;

the main switch of each of the (k+2)-th to the M-th adjustable resistor string group of the M adjustable resistor string groups is turned on; and the main switch and the switches of the (k+1)-th adjustable resistor string group are controlled based on the thermometer code.

7. The resistor trimming device of claim 4, wherein when the M-th adjustable resistor string group is selected, the main switch and the (N−1) switches of each of the first to the (M−1)-th adjustable resistor string groups of the M adjustable resistor string groups are turned off, and the main switch and the switches of the M-th adjustable resistor string group are controlled based on the thermometer code.

8. The resistor trimming device of claim 7, wherein when all bits of the trimming thermometer code are 0, the main switch and the (N−1) switches of the selected adjustable resistor string group are turned on;

wherein when the last x bits of the trimming thermometer code Y[(N−2):0] are 1, the other bits of the trimming thermometer code Y are 0, x is 1 to N−1, Y[(N−2):(x)]=000 . . . 0 and Y[(x−1): 0]=111 . . . 1, the main switch of the selected adjustable resistor string group is turned off, the first switch to the x-th switch of the (N−1) switches of the selected adjustable resistor string group are turned off, and the (x+1)-th switch to the (N−1) switch of the (N−1) switches of the selected adjustable resistor string group are turned on.

9. The resistor trimming device of claim 1, wherein the resistor trimming device is configured to provide a trimming resistance with one of 0, R, . . . , and (N*M−1)*R, wherein R is a resistance of each of the N resistors.

10. An electronic device, comprising:

a first resistor;

a second resistor; and a resistor trimming device, comprising:

a decoder, configured to receive a binary code or an original thermometer code, and generating a trimming thermometer code and a group code based on the binary code or the original thermometer code; and a resistor trimming module, electrically connected to the decoder, and comprising M adjustable resistor string groups serially connected to each other, wherein M is a number of groups, and M is an integer which is greater than 2, wherein each of the resistor string groups comprises a main switch, (N−1) switches, and N resistors with the same resistance as each other, wherein a first end of the main switch is electrically connected to a first end of the first resistor in the N resistors, and a second end of the main switch is electrically connected to a second end of the Nth resistor of the N resistors, wherein a first end of the i-th switch of the (N−1) switches is electrically connected to a second end of the i-th resistance of the N resistors, and second end of the i-th switch of the (N−1) switches is electrically connected to a N-th resistor of the N resistors, wherein N is a number of resistors of each the M adjustable resistor string groups, N is an integer which is greater than 2, and i is an integer between 1 and N, and wherein the main switch and every switches in each the M adjustable resistor string groups are controlled based on the trimming thermometer code and the group code.

11. The electronic device of claim 10, wherein the decoder comprises:

a code table and a logic circuit, wherein the code table records an mapping relationship between a group thermometer code and the binary code or the original thermometer code, wherein the group thermometer code comprises the group code and the trimming thermometer code, and the logic circuit is configured to generate a plurality of control signals based on the group code and the trimming thermometer code, so as to control the main switch and the switches of each the M adjustable resistor string groups.

12. The electronic device of claim 11, wherein the group code has (M−1) bits which are indicated by G[(M−2):0];

the trimming thermometer code has N bits which are indicated by Y[(N−2):0];

the group code G[(M−2):0] is configured to indicates one of the M adjustable resistor string groups which is selected; and the trimming thermometer code Y[(N−2):0] is configured to control the main switch and switches of each the M adjustable resistor string groups which is selected.

13. The electronic device of claim 12, wherein when the group code G[(M−2):0]=00 . . . 0, it indicates a first adjustable resistor string group in the M adjustable resistor string groups to be selected;

when a first bit to a k-th bit of the group code G[(M−2):0] are 11 . . . 1, and a (k+1)-th bit to a (M−1)-th bit of the group code G[(M−2):0] are 00 . . . 0, the group code G[(M−2):0] is configured to indicate that the (k+1)-th adjustable resistor string group of the M adjustable resistor string groups is selected, and k is an integer between 1 and (M−1).

14. The electronic device of claim 13, wherein when the first adjustable resistor string group is selected, the main switch of each of the second to the M-th adjustable resistor string groups of the M adjustable resistor string groups is turned on;

the main switch and the switches of the first adjustable resistor string group are controlled based on the thermometer code.

15. The electronic device of claim 13, wherein when a (k+1)-th adjustable resistor string group is selected, the main switch and the switches of each of the first to the k-th adjustable resistor string groups of the M adjustable resistor string groups are turned off;

the main switch of each of the (k+2)-th to the M-th adjustable resistor string group of the M adjustable resistor string groups is turned on; and the main switch and the switches of the (k+1)-th adjustable resistor string group are controlled based on the thermometer code.

16. The electronic device of claim 13, wherein when the M-th adjustable resistor string group is selected, the main switch and the switches of each of the first to the (M−1)-th adjustable resistor string groups of the M adjustable resistor string groups are turned off, and the main switch and the switches of the M-th adjustable resistor string group are controlled based on the thermometer code.

17. The electronic device of claim 16, wherein when all bits of the trimming thermometer code are 0, the main switch and the switches of the selected adjustable resistor string group are turned on; and when the last x bits of the trimming thermometer code Y[(N−2):0] are 1, the other bits of the trimming thermometer code Y are zero, x is 1 to N−1, that is, Y[(N−2): (x)]=000 . . . 0 and Y[(x−1): 0]=111 . . . 1, so that the main switch of the selected adjustable resistor string group is turned off, the first switch to the x-th switch of the (N−1) switches are turned off, and the (x+1)-th switch to the (N−1) switch of the (N−1) switches are turned on.

18. The electronic device of claim 10, wherein a trimming resistance of one of 0, R, . . . , (N*M−1)*R is provided by the resistor trimming device;

a resistance of a parallel resistor faced by a first switch of each of the M adjustable resistor string groups is N*R, wherein R is a resistance of each of the N resistors.

* * * * *